(12) United States Patent
Yan et al.

(10) Patent No.: US 10,565,711 B2
(45) Date of Patent: Feb. 18, 2020

(54) SELF-AWARE IMAGE SEGMENTATION METHODS AND SYSTEMS

(71) Applicant: KONINKLIJKE PHILIPS N.V., Eindhoven (NL)

(72) Inventors: Pingkun Yan, Gaithersburg, MD (US); Christopher Stephen Hall, Kirkland, WA (US); Kongkuo Lu, Briarcliff Manor, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 40 days.

(21) Appl. No.: 15/574,296

(22) PCT Filed: Apr. 29, 2016

(86) PCT No.: PCT/IB2016/052425
§ 371 (c)(1),
(2) Date: Nov. 15, 2017

(87) PCT Pub. No.: WO2016/185306
PCT Pub. Date: Nov. 24, 2016

(65) Prior Publication Data
US 2018/0130213 A1 May 10, 2018

Related U.S. Application Data

(60) Provisional application No. 62/163,101, filed on May 18, 2015.

(51) Int. Cl.
*G06T 7/13* (2017.01)
*G06T 7/136* (2017.01)
*G06T 7/143* (2017.01)
*G06T 7/00* (2017.01)

(52) U.S. Cl.
CPC .............. *G06T 7/13* (2017.01); *G06T 7/0012* (2013.01); *G06T 7/136* (2017.01); *G06T 7/143* (2017.01);
(Continued)

(58) Field of Classification Search
CPC . G06T 2207/20081; G06T 2207/30004; G06T 7/0012; G06T 7/10–194
See application file for complete search history.

(56) References Cited

U.S. PATENT DOCUMENTS 6,031,935 A * 2/2000 Kimmel ................... G06K 9/48
382/170
2010/0002917 A1 * 1/2010 Sakaida .................. A61B 6/032
382/128
(Continued)

FOREIGN PATENT DOCUMENTS

WO 2013047278 A1 4/2013
WO WO2018-074380 * 7/2017 ............... G06K 9/00

OTHER PUBLICATIONS

Aljabar, Paul et al "Classifier Selection Strategies for Label Fusion using Large Atlas Databases", Medical Image Computing and Computer-Assisted Intervention—2007, pp. 523-531.
(Continued)

*Primary Examiner* — Ross Varndell

(57) ABSTRACT

The following relates generally to image segmentation. In one aspect, an image is received and preprocessed. The image may then be classified as segmentable if it is ready for segmentation; if not, it may be classified as not segmentable. Multiple, parallel segmentation processes may be performed on the image. The result of each segmentation process may be marked as a potential success (PS) or a potential failure (PF). The results of the individual segmentation processes may be evaluated in stages. An overall failure may be declared if a percentage of the segmentation processes marked as PF reaches a predetermined threshold.

22 Claims, 4 Drawing Sheets

Figure 1:
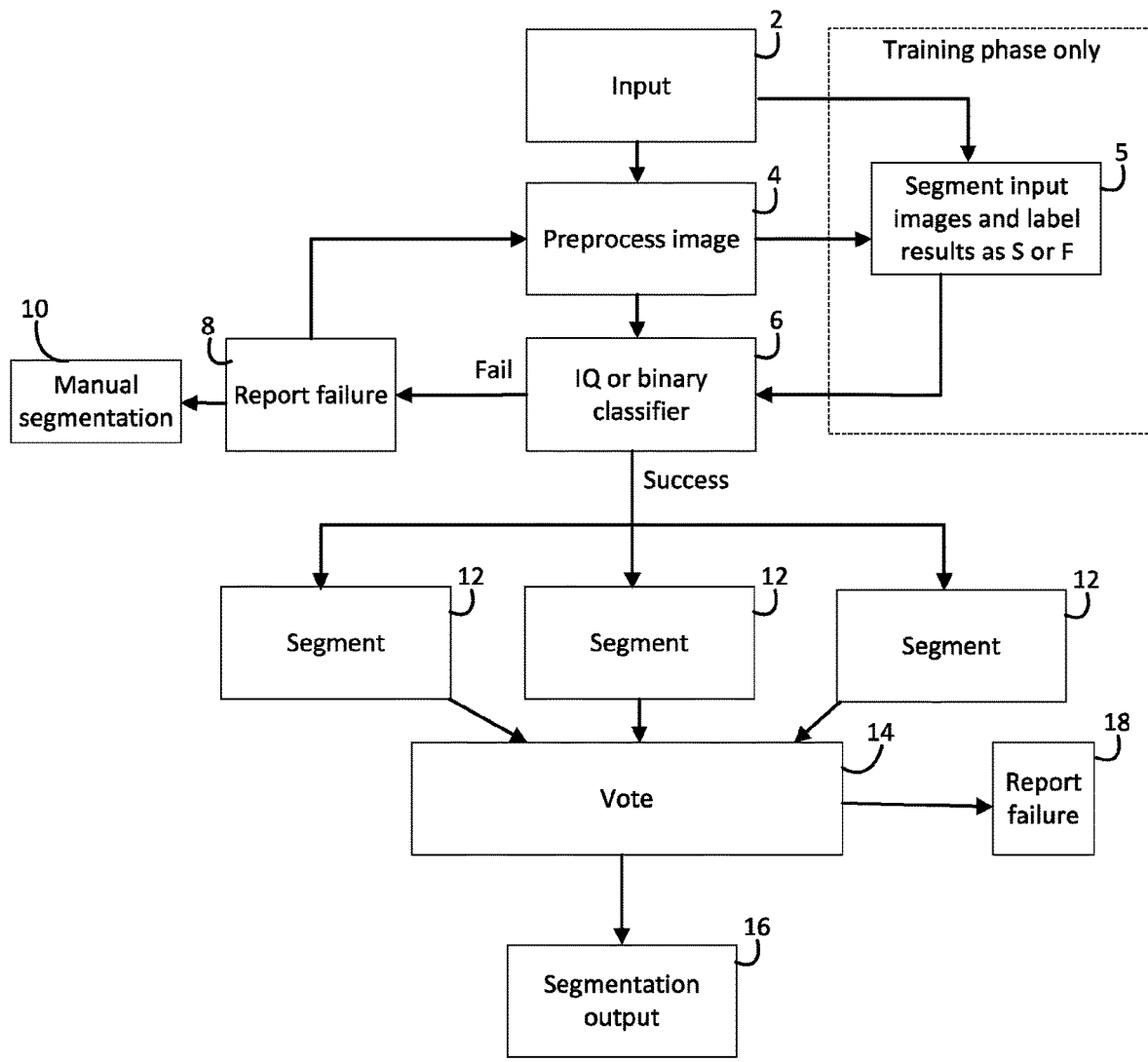

(52) U.S. Cl.
CPC .............. *G06T 2207/20081* (2013.01); *G06T 2207/30004* (2013.01)

(56) References Cited

U.S. PATENT DOCUMENTS

| | | | | |
|---|---|---|---|---|
| 2014/0341471 | A1* | 11/2014 | Ono | A61B 5/055 382/173 |
| 2016/0300351 | A1* | 10/2016 | Gazit | G06T 7/11 |
| 2017/0147908 | A1* | 5/2017 | Chen | G06T 7/11 |

OTHER PUBLICATIONS

Phouladay, Hady Ahmady et al "Experiments with Large Ensembles for Segmentation and Classification of Cervical Cancer Biopsy Images", 2014 IEEE International Conference on Systems, Man, and Cybernetics, pp. 870-875.

Warfield, S.K. et al "Simultaneous Truth and Performance Level Estimation (Staple): An Algorithm for the Validation of Image Segmentation", IEEE Transactions on Medical Imaging, vol. 23, No. 7, Jul. 2004, pp. 903-921.

Uchill, J. et al "Classification of Segmentable Images using the PDD Function", Proceedings 2003 International Conference on Image Processing, vol. 3, Sep. 2003, pp. 525-528.

Yijun, Huang et al "Signal Quality Assessment of Retinal Optical Coherence Tomography Images" Investigative Opthalmology & Visual Science, vol. 53, No. 4, Apr. 2012, pp. 2133.

Yan, Pingkun et al "Adaptively Learning Local Shape Statistics for Prostate Segmentation in Ultrasound", IEEE Transactions on Biomedical Engineering, vol. 58, No. 3, Mar. 2011.

\* cited by examiner

SELF-AWARE IMAGE SEGMENTATION METHODS AND SYSTEMS

CROSS-REFERENCE TO PRIOR APPLICATIONS

This application is the U.S. National Phase application under 35U.S.C. § 371 of International Application No. PCT/IB2016/052425, filed on Apr. 29, 2016, which claims the benefit of U.S. Provisional Patent Application No. 62/163,101, filed on May 18, 2015. These applications are hereby incorporated by reference herein.

BACKGROUND

The following relates generally to the image processing arts, image segmentation arts, and related arts, and to applications employing segmented images such as urology treatment planning, inverse planning for intensity-modulated radiation therapy (IMRT), and so forth.

In various imaging tasks such as urology treatment planning, radiation therapy planning, and so forth, the prostate or other organ or tumor of interest is segmented in a computed tomography (CT), magnetic resonance (MR), ultrasound (US), or other 2D or 3D medical image. The segmentation process entails delineating boundaries of the prostate, tumor, or other anatomical feature(s) of interest in the image. Various approaches may be used to perform the segmentation, such as an adaptive mesh fitting approach or a region growing approach. Most automated segmentation approaches are iterative in nature.

A problem in such automated segmentation approaches is that sometimes the segmentation algorithm fails to converge to the correct solution, e.g. the mesh may be erroneously fitted to something other than the organ of interest, or the growing region may leak out of a gap in the region boundary. Conventionally, the solution is to have a radiologist or other trained professional review the segmentation result for accuracy, and, if an inaccurate result is obtained, the radiologist takes suitable remedial action.

Segmentation failures are reduced, but have not been eliminated, by training the segmentation algorithm on a large set of training images. The training set should encompass the range of image variations likely to be encountered, but complete coverage of all possible variants is generally not possible. Moreover, robustness of the segmentation process depends on the initial conditions (e.g. initial mesh, or seed locations for region growth approaches).

The present disclosure provides approaches for addressing this problem and others.

SUMMARY

In one aspect, an apparatus for segmenting a medical image includes at least one processor programmed to: perform multiple, parallel segmentation processes on an input image to generate a plurality of segmentation results; mark each segmentation result of the multiple, parallel segmentation processes as a potential success (PS) or potential failure (PF); and combine the segmentation results marked as PS to produce an output segmentation result for the input image.

In the apparatus as described in the preceding paragraph, the plurality of segmentation results may include both intermediate segmentation results and a final segmentation result for each segmentation process of the multiple, parallel segmentation processes; and optionally, only the final segmentation results marked as PS are combined to produce the output segmentation result for the input image. The at least one processor may be further programmed to declare an overall failure if a percentage of the multiple, parallel segmentation processes having an intermediate segmentation result marked as PF reaches a predetermined threshold. The multiple, parallel segmentation processes may be iterative segmentation processes; the plurality of segmentation results may include both intermediate segmentation results produced by non terminal iterations of the segmentation processes and a final segmentation result produced by each segmentation process; and the at least one processor may be further programmed to: at each iteration of the iterative segmentation processes, adjust a measurement criteria used in marking each segmentation result of the multiple, parallel segmentation processes as a PS or PF. The marking operation may include: identifying a largest group of mutually similar segmentation results, wherein: segmentation results belonging to the largest group of mutually similar segmentation results may be marked as PS; and segmentation results not belonging to the largest group of mutually similar segmentation results may be marked as PF. The multiple, parallel segmentation processes may employ different segmentation process initializations. The different segmentation process initializations may be generated by random perturbations of a baseline segmentation process initialization. The at least one processor may be further programmed to generate an uncertainty or confidence interval for the output segmentation result based on a statistical variation of the segmentation results marked as PS. Each segmentation result may be marked with a probability value PPS of being a PS and with a probability value PPF of being a PF, where for each segmentation result PPS may be in a range [0,1], PPF may be in a range [0,1], and PPS+PPF=1. The at least one processor may be further programmed to, prior to the performing multiple, parallel segmentation processes on the input image: preprocess the input image; and classify, with a binary classifier, the input image as a segmentable or not segmentable. The preprocessing may include performing at least one of the following on the input image: smoothing; contrast enhancement; edge detection; or non-rigid deformation. The at least one processor may be further programmed to perform a training phase in which the binary classifier is trained by receiving multiple training images wherein each training image of the multiple training images may be labeled as segmentable or not segmentable.

In another aspect, an image segmentation method includes: classifying, with a computer implemented binary classifier, an input image as segmentable using a computer implemented segmentation process or not segmentable using the computer implemented segmentation process; segmenting the input image using the computer implemented segmentation process if the input image is classified as segmentable; and performing a remedial process if the input image is classified as not segmentable.

The method as described in the preceding paragraph may include performing computer implemented pre-processing of the input image prior to the classifying, the classifying being performed on the pre-processed input image; wherein the remedial process may include performing further computer implemented pre-processing of the input image. The method may further include: acquiring the input image using a medical imaging system; wherein the remedial process may include acquiring a new input image using the medical imaging system with a different imaging configuration. The method may further include that during a training phase performed prior to the classifying, training the binary classifier using a computer implemented training process operating on a set of training images each labeled as segmentable or not segmentable. The method may further include segmenting each training image using the computer implemented segmentation process and labeling the training image as segmentable or not segmentable based on an output of the segmenting. The method may further include that the computer implemented segmentation process comprises multiple, parallel segmentation processes. The method may further include that each segmentation process of the multiple, parallel segmentation processes is different from every other segmentation process of the multiple, parallel segmentation processes. The method may further include that each segmentation process of the multiple, parallel segmentation processes has a different segmentation process initialization generated by a random perturbation of a baseline segmentation process initialization. The method may further include that the computer-implemented segmentation process further comprises (1) grouping segmentation results of the multiple, parallel segmentation processes to identify a group of mutually similar segmentation results and (2) generating a final segmentation result for the input image based on the group of mutually similar segmentation results.

One advantage resides in providing a robust system of determining if a failure has occurred in an image segmentation process.

Another advantage resides in minimizing supervision needed to ensure proper segmentation.

Another advantage resides in providing a self-aware image segmentation process.

Other advantages will become apparent to one of ordinary skill in the art upon reading and understanding this disclosure. It is to be understood that a specific embodiment may attain, none, one, two, more, or all of these advantages.

The invention may take form in various components and arrangements of components, and in various steps and arrangements of steps. The drawings are only for purposes of illustrating the preferred embodiments and are not to be construed as limiting the invention.

FIG. 1 diagrammatically shows an image segmentation system.

Figure 2:
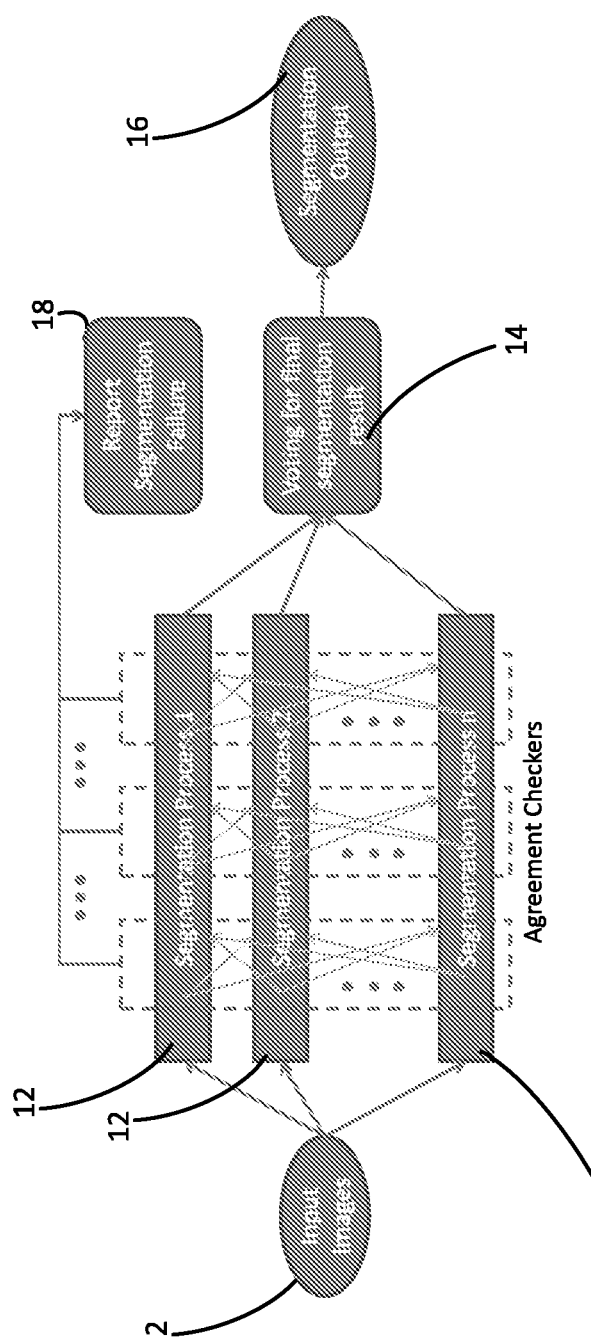

FIG. 2 diagrammatically shows leveraging of the multiple, parallel segmentation processes performed by the system of FIG. 1 to produce a robust output segmentation result.

Figure 3:
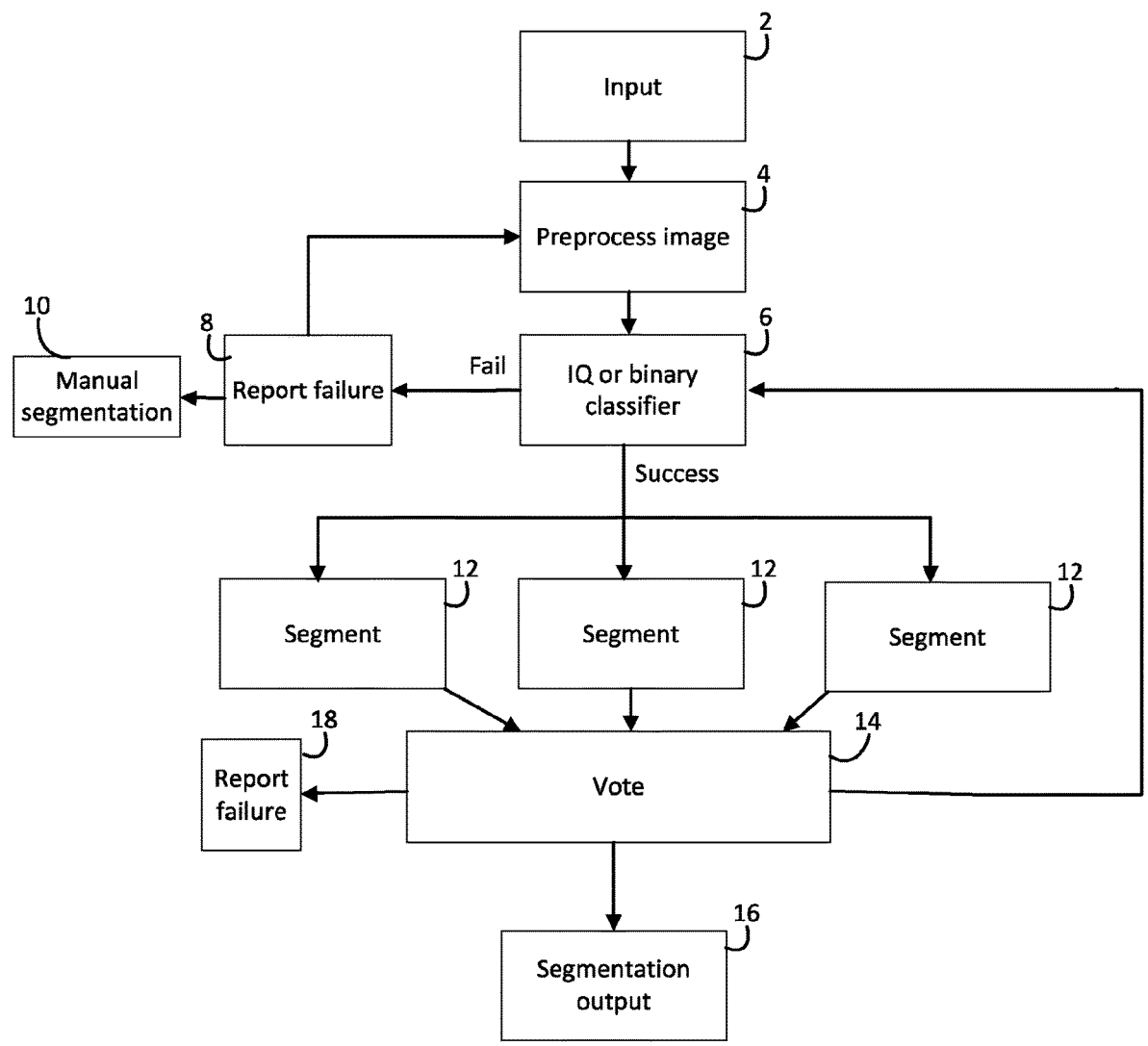

FIG. 3 diagrammatically shows an alternate embodiment of an image segmentation process.

Figure 4:
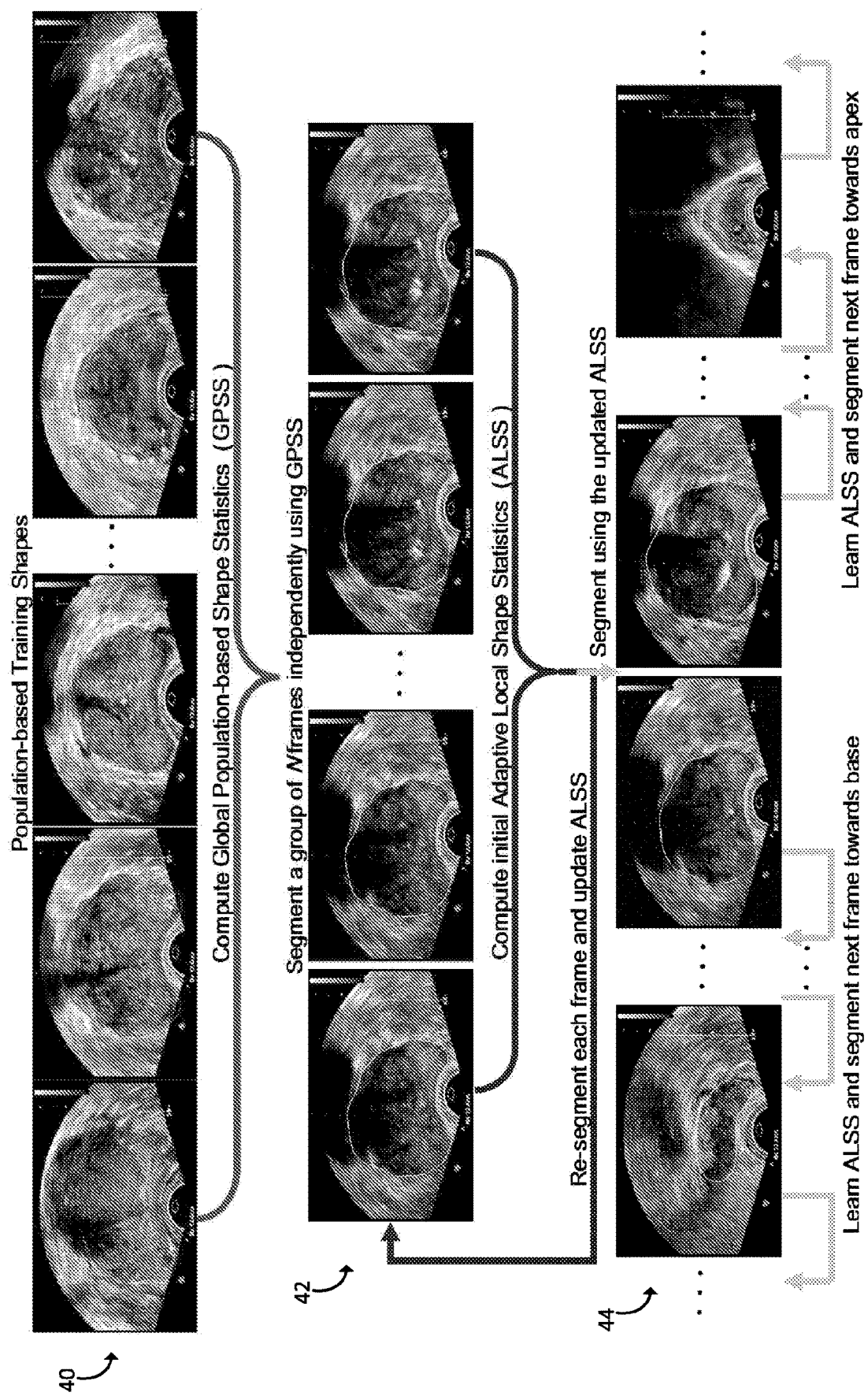

FIG. 4 shows an illustrative example of an ultrasound prostate image segmentation.

DETAILED DESCRIPTION

In segmentation approaches disclosed herein, statistical techniques are applied to provide "self-aware" segmentation which is capable of automatically assessing the quality or reliability of the output segmentation result. In one disclosed approach for self-aware segmentation, multiple, parallel segmentation processes are performed with different segmentation process initiations, for example produced by random perturbations of a baseline segmentation process initiation. The results of these multiple, parallel segmentation processes are grouped (e.g. clustered) to identify a largest group of mutually similar segmentation results, which are then combined using a voting process, (weighted) averaging, or some other aggregation technique. The approach is "self-aware" in that the clustering identifies the mutually similar (and hence presumably "correct") segmentation results, while discarding the outlier (and hence presumably "wrong") segmentation results. On the other hand, if no sufficiently large and/or sufficiently mutually similar group of segmentation results can be identified, then overall segmentation failure is thereby recognized automatically. A further "self-aware" aspect is that a variance, standard deviation, or other statistical variation of the "correct" segmentation results provides a quantitative uncertainty or confidence interval for the output segmentation result.

In another disclosed approach, a segmentation process (which may in some embodiments comprise multiple, parallel segmentation processes as just described) is applied to a set of training images, and each training image is labeled as either (1) segmentable if the segmentation result is deemed satisfactory or (2) not segmentable if the segmentation result is deemed unsatisfactory. These labels may be applied manually (e.g. by having a radiologist or other skilled medical professional evaluate the segmentation result) or using some automated process. These training images are then used to train a binary classifier to classify an input image as either segmentable or not segmentable. In an inference phase, the trained binary classifier is applied to an input image to determine whether it is segmentable or not segmentable. If the input image is classified as segmentable, then the segmentation process is applied with a high likelihood of success due to the input image having successfully passed the classifier. If the input image is classified as not segmentable, then some remedial process is applied. For example, if the classifier is applied during the imaging session then the remedial process may be to acquire a new input image using a different imaging configuration. As another example, if the input image is pre-processed before being classified then further (possibly different) pre-processing may be applied. This approach is "self-aware" in that the trained binary classifier provides automated awareness as to whether the input image is segmentable using the segmentation process.

With reference to FIG. 1, an input image 2 is optionally preprocessed in operation 4. The input image 2 may be an image from, for example, computed tomography (CT), magnetic resonance (MR), ultrasound (US), or other medical imaging source, and may be a two-dimensional (2D) image (or image slice) or a three-dimensional (3D) image (or image volume). The preprocessing is done, for example, to prepare an image for later segmentation. The preprocessing may include contrast enhancement, edge detection, non-rigid deformation to align with a reference image or structural model, fusing of various thusly pre-processed images, or so forth.

After the input image 2 is preprocessed, the image is sent to an image quality (IQ) binary classifier 6. Binary classifier 6 determines if the image is segmentable, that is, may be successfully segmented, by a particular computer-implemented segmentation process. Said another way, the classifier 6 classifies the image as either segmentable or not segmentable. The classifier is trained, as described below, so that if the image is classified as segmentable then there is a high likelihood that the computer-implemented segmentation process will be able to successfully segment the image; whereas, if the image is classified as not segmentable, then there is a high likelihood that the computer-implemented segmentation process will fail to segment the image.

If the image is classified as not segmentable by the classifier 6, then in the illustrative embodiment a segmentation failure is reported 8, and optionally some further remedial action is taken such as performing further preprocessing 4 (which may be further iterations of the same preprocessing that was initially performed, and/or some different type of preprocessing), or segmenting the image manually or semi-manually in an operation 10 (for example, by a radiologist operating a graphical user interface to draw contour lines around features). More generally, the response to the image being classified by the classifier 6 as not segmentable is to perform some remedial action. As another example, if the classifer 6 is applied during the imaging session (possibly without performing the pre-processing 4), then the remedial action may include acquiring a new input image using the medical imaging system (e.g CT, MR, US, or so forth) with a different imaging configuration. On the other hand, if the image is classified as segmentable by the classifier 6, then the image segmentation process is performed on the input (and optionally preprocessed) image with a high likelihood of success due to the image having successfully passed the classifier 6.

To provide accurate prediction of whether an input image is segmentable by a given image segmentation process, the binary classifier 6 is trained in a training phase performed for that segmentation process. In one approach, training images with various (possibly different or perturbed) preprocessing are segmented using the chosen segmentation algorithm, with each result being labeled (e.g. manually) as successful or failed so as to create a labeled training set of input images. A set of image features (including, e.g., image histogram, gradient histogram, histogram moments or so forth) is extracted from each training image, and binary classifier 6 is then trained on the feature vectors to optimally distinguish images that can be successfully segmented using the segmentation algorithm from images for which the segmentation algorithm fails.

In a variant embodiment, binary classifier 6 may be trained on as-acquired (not pre-processed) images which thereafter pass through a fixed preprocessing/segmentation pipeline and are labeled as to whether they were successfully segmented. In this case, the trained classifier may be applied to as-acquired images during the imaging session to validate whether the images can be successfully segmented using the chosen preprocessing/segmentation pipeline if not, then remedial action can be immediately taken in the form of acquiring further images using different image acquisition settings until images that can be successfully segmented are obtained.

With continuing reference to FIG. 1 and with further reference now to FIG. 2, if binary classifier 6 determines that an image may be successfully segmented, then the chosen computer-implemented segmentation process is applied with a high likelihood of success. In the illustrative example of FIGS. 1 and 2, the chosen computer-implemented segmentation process comprises multiple, parallel segmentation processes 12 which are performed concurrently on the image (after the optional preprocessing 4). Advantageously, each segmentation process 12 may be different than every other segmentation process 12. As used herein, the term "computer-implemented" segmentation process denotes a segmentation process that is executed automatically (and typically, though not necessarily, iteratively) by a computer, without relying upon input received from a user such as user-drawn contours except possibly as part of the initialization of the computer-implemented segmentation process (for example, user-drawn contours could delineate an initial mesh that is thereafter automatically fitted to image structure of interest by the computer-implemented segmentation process).

Running multiple parallel segmentation processes optionally leverages parallel computing resources such as multi core computers, computing clusters, supercomputers, graphical processing units (GPUs) or the like to perform the set of parallel segmentation processes 12 concurrently, each starting from different initial conditions (e.g. different perturbed initial meshes, or different seed points). It is expected that most of these segmentation processes will converge to the (same) correct solution, and hence be similar to each other. On the other hand, segmentation failures will output (different) wrong solutions. A statistical analysis approach (e.g. agreement checking operation 14) is used to identify the largest group of mutually similar (correct) results and discard the smaller group(s) of dissimilar (wrong) results. This may be done, for example, by computing pairwise similarities between segmentation results and performing k-means clustering or another clustering algorithm. With the groups identified, correct results (those belonging to the largest group of mutually similar segmentation results) are marked as potential successes (PS), and wrong results (those not belonging to the largest group of mutually similar segmentation results) are marked as potential failures (PF). If no sufficiently large group of mutually similar results is obtained, then overall segmentation failure is reported in operation 18.

If a sufficiently large group of similar results is obtained, then these are aggregated or combined by averaging or voting or the like to generate the final (correct) segmentation result, as shown in operation 16. Statistical variations amongst the group of similar (correct) results (that is, the segemenation results marked as PS) may optionally be used to provide an uncertainty or confidence interval for the output segmentation result.

To provide useful information in a statistical sense, the multiple, parallel segmentation processes 12 should employ different segmentation processes and/or different segmentation process initializations. For example, in one approach, different segmentation process initializations are generated by random perturbations of a baseline segmentation process initialization (e.g., different random perturbations of an initial mesh).

In the illustrative example, each segmentation result is marked as either PS or PF. This is an exclusive, i.e. hard allocation of the segmentation results. In variant embodiments, a soft allocation may be employed—for example, each segmentation result may be marked with a probability value $P_{PS}$ of being a PS and with a probability value $P_{PF}$ of being a PF, where for each segmentation result $P_{PS}$ is in a range [0,1], $P_{PF}$ is in a range [0,1], and $P_{PS}+P_{PF}=1$. The probabilities $P_{PS}$ and $P_{PF}$ may, for example, be assigned based on distance in the feature vector space from the centroid of the largest cluster of mutually similar segmentation results. In soft allocation embodiments, $P_{PF}$ may be thresholded to provide a count of segmentation results whose probability of failure is above the threshold for the purpose of identifying an overall segmentation failure 18.

As particularly illustrated in FIG. 2, the multiple, parallel segmentation processes 12 are, in some embodiments, each an iterative segmentation process. In this case, the agreement checking 14 may be applied after each iteration, or after some number N iterations (or, alternatively, after some execution time period over which some of the segmentation processes 12 may have run more iterations than others). The failure report 18 issues if the fraction of the parallel segmentation processes 12 marked as PF at any checked iteration exceeds the overall failure threshold.

Discarding wrong results provides increased robustness for the overall clustering, which may optionally be leveraged to allow use of a faster, simpler (but perhaps less reliable) segmentation process for the individual segmentation processes 12 that are run concurrently, so as to at least partially offset the increased computational cost of performing multiple parallel segmentation processes. Discarding wrong results provides a technical advantage because, for example, it reduces: (i) the processing burden on any processors and (ii) the storage space required in any memory. As previously noted, the disclosed approach of performing multiple, parallel segmentation processes also efficiently utilizes parallel computing resources if available. Thus, the disclosed segmentation approaches improve performance of the computer itself.

With reference to FIG. 3, in one variant embodiment, an output from the agreement checking unit 14 is sent back to the binary classifier 6. Advantageously, this allows for reclassification of an image after segmentation processes have been run on the image. The reclassification in turn allows for the possibility of additional preprocessing to better prepare the image for subsequent segmentation processes 12.

FIG. 4 illustrates an example of ultrasound prostate image segmentation. This example uses a statistical shape model, and the model is continuously updated to adapt to local shape changes as the object shape varies in the video. This method works well when the prostate boundary each video frame is correctly segmented and the new shapes can be used for online improving the statistical shape model. However, once a set of frames is not correctly segmented, the error may be compounded or accumulated and propagated through the rest of the segmentation and a failure results. The workflow of this example is as follows.

In the example of FIG. 4, global population-based shape statistics (GPSS) is first computed by using a number of manually segmented contours obtained from a number of different subjects' transrectal ultrasound (TRUS) video sequences in row/operation 40. The GPSS deformable contour is used to segment the first N frames from frame 0 to frame N−1 independently. The mean shape in the GPSS is used to automatically initialize the segmentation contour. The resulting shapes will be stored. After that, an initial adaptive local shape statistics (ALSS) is computed by using the segmented contours from those N frames in row/operation 42. This ALSS is then used as the shape constraint of the deformable contour for segmenting the next frame as shown in row/operation 44.

As the example continues and as shown in the row/operation 42 of FIG. 4, the deformable contour using ALSS will go back to segment the first frame of the video sequence, which is now considered as the N+1th frame, with the previous segmentation result as the initialization. After the segmentation is done, the obtained prostate shape will be added into the training shape set. ALSS is learned by using the new set of training shapes. With the updated ALSS, the deformable contour moves to segment the next frame. The learning and segmentation process is repeated until the whole video sequence is segmented.

The capability for self-aware failure detection may be added at two stages. The first stage may be that multiple, parallel segmentation processes 12 are applied to the segmentation from one frame to the next frame. Instead of using a single initialization for next frame segmentation, a set of perturbed initializations can be generated. Thus, multiple segmentation processes are created and each process has a different initialized shape. If the segmentation goes well, the results from different processes tend to agree. Otherwise, significantly different segmentation results may be obtained; this will lead to the suspicion of segmentation failure as indicated by failure report 18 of FIG. 1. The second stage at which self-aware failure detection may be added is that the classifier 6 is used to classify the image quality of the frame. If the acquisition quality of the frame is classified to be poor, a segmentation error exception may be thrown (e.g. failure report 8 of FIG. 1). If the quality is considered to be good, the problem may be with the particular segmentation method. Subsequently, another alternative segmentation method can be called or manual interaction can be applied for correction.

The disclosed processing components 4, 6, 8, 12, 14, 18 are of FIG. 1 are suitably embodied by an electronic data processing device such as a computer or parallel computing system. As previously mentioned, the multiple, parallel segmentation processes 12 may advantageously be implemented using a parallel computing resource such as a multi-core computer, supercomputer, computing cluster, GPU, or the like so as to efficiently leverage the parallel processing capability. The classifier trainer 5 may be implemented using the same computer system as is used for processing the input image 2, or may be performed offline by a different computer, such as a dedicated server. The manual segmentation 10 may be implemented using, for example, a computer providing a graphical user interface (GUI) with a mouse, touchscreen, or other user input device via which a user may draw contours or otherwise manually delineate structure in the input image.

It will be further appreciated that the techniques disclosed herein may be embodied by a non-transitory storage medium storing instructions readable and executable by an electronic data processing device (such as a microprocessor, GPU or so forth) to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. An apparatus for segmenting a medical image, comprising:
    a memory that stores instructions; and
    a processor that executes the instructions, wherein, when executed by the processor, the instructions cause the processor to:
    perform multiple, parallel segmentation processes employing different segmentation process initializations on an input image to generate a plurality of segmentation results, wherein the different segmentation process initializations are generated by random perturbations of a baseline segmentation process initialization;
    mark each segmentation result of the multiple, parallel segmentation processes as a potential success (PS) or potential failure (PF); and
    combine the segmentation results marked as PS to produce an output segmentation result for the input image.

2. The apparatus according to claim 1, wherein:
    the plurality of segmentation results include both intermediate segmentation results and a final segmentation result for each segmentation process of the multiple, parallel segmentation processes; and only the final segmentation results marked as PS are combined to produce the output segmentation result for the input image.

3. The apparatus according to claim 2, wherein the instructions further cause the processor to:
declare an overall failure if a percentage of the multiple, parallel segmentation processes having an intermediate segmentation result marked as PF reaches a predetermined threshold.

4. The apparatus according to claim 1, wherein the multiple, parallel segmentation processes are iterative segmentation processes, the plurality of segmentation results include both intermediate segmentation results produced by non-terminal iterations of the segmentation processes and a final segmentation result produced by each segmentation process, and the instructions further cause the processor to:
at each iteration of the iterative segmentation processes, adjust a measurement criteria used in marking each segmentation result of the multiple, parallel segmentation processes as a PS or PF.

5. The apparatus according to claim 1, wherein the instructions cause the processor to mark each segmentation result of the multiple, parallel segmentation processes as a potential success (PS) or potential failure (PF), the instructions further cause the processor to:
identify a largest group of mutually similar segmentation results, wherein: segmentation results belonging to the largest group of mutually similar segmentation results are marked as PS; and
segmentation results not belonging to the largest group of mutually similar segmentation results are marked as PF.

6. The apparatus according to claim 1, wherein the instructions further cause the processor to: generate an uncertainty or confidence interval for the output segmentation result based on a statistical variation of the segmentation results marked as PS.

7. The apparatus according to claim 1, wherein each segmentation result is marked with a probability value $P_{PS}$ of being a PS and with a probability value $P_{PF}$ of being a PF, where for each segmentation result $P_{PS}$ is in a range [0,1], $P_{PF}$ is in a range [0,1], and $P_{PS}+P_{PF}=1$.

8. The apparatus according to claim 7, wherein prior to the performing multiple, parallel segmentation processes on the input image, the instructions further cause the processor to:
preprocess the input image; and
classify, with a binary classifier, the input image as a segmentable or not segmentable, wherein the multiple, parallel segmentation processes are performed only if the input image is classified as segmentable.

9. The apparatus of claim 8, wherein the preprocessing comprises performing at least one of the following on the input image:
smoothing;
contrast enhancement;
edge detection; or
non-rigid deformation.

10. The apparatus according to claim 8, wherein the instructions further cause the processor to perform a training phase in which the binary classifier is trained by receiving multiple training images wherein each training image of the multiple training images is labeled as segmentable or not segmentable.

11. A medical system for segmenting a medical image, the medical system comprising:
an input for receiving an input image;
image quality (IQ) binary classifier configured to determine in the input image is segmentable;
a memory that stores instructions; and
a processor that executes the instructions, wherein, when executed by the processor, the instructions cause the processor to:
perform multiple, parallel segmentation processes employing different segmentation process initializations on an input image to generate a plurality of segmentation results, wherein the different segmentation process initializations are generated by random perturbations of a baseline segmentation process initialization;
mark each segmentation result of the multiple, parallel segmentation processes as a potential success (PS) or potential failure (PF); and
combine the segmentation results marked as PS to produce an output segmentation result for the input image.

12. The medical system according to claim 11, wherein:
the plurality of segmentation results include both intermediate segmentation results and a final segmentation result for each segmentation process of the multiple, parallel segmentation processes; and
only the final segmentation results marked as PS are combined to produce the output segmentation result for the input image.

13. The medical system according to claim 12, wherein the instructions further cause the processor to:
declare an overall failure if a percentage of the multiple, parallel segmentation processes having an intermediate segmentation result marked as PF reaches a predetermined threshold.

14. The medical system according to claim 11, wherein the multiple, parallel segmentation processes are iterative segmentation processes, the plurality of segmentation results include both intermediate segmentation results produced by non-terminal iterations of the segmentation processes and a final segmentation result produced by each segmentation process, and the instructions further cause the processor to:
at each iteration of the iterative segmentation processes, adjust a measurement criteria used in marking each segmentation result of the multiple, parallel segmentation processes as a PS or PF.

15. The medical system according to claim 11, wherein the instructions cause the processor to mark each segmentation result of the multiple, parallel segmentation processes as a potential success (PS) or potential failure (PF), the instructions further cause the processor to:
identify a largest group of mutually similar segmentation results, wherein: segmentation results belonging to the largest group of mutually similar segmentation results are marked as PS; and
segmentation results not belonging to the largest group of mutually similar segmentation results are marked as PF.

16. The medical system according to claim 11, wherein the instructions further cause the processor to:
generate an uncertainty or confidence interval for the output segmentation result based on a statistical variation of the segmentation results marked as PS.

17. The medical system according to claim 11, wherein each segmentation result is marked with a probability value $P_{PS}$ of being a PS and with a probability value $P_{PF}$ of being a PF, where for each segmentation result $P_{PS}$ is in a range [0,1], $P_{PF}$ is in a range [0,1], and $P_{PS}+P_{PF}=1$.

18. The medical system according to claim 17, wherein prior to the performing multiple, parallel segmentation processes on the input image, the instructions further cause the processor to:
preprocess the input image; and
classify, with a binary classifier, the input image as a segmentable or not segmentable, wherein the multiple, parallel segmentation processes are performed only if the input image is classified as segmentable.

19. The medical system according to claim 18, wherein the preprocessing comprises performing at least one of the following on the input image:
smoothing;
contrast enhancement;
edge detection; or
non-rigid deformation.

20. The medical system according to claim 18, wherein the instructions further cause the processor to perform a training phase in which the binary classifier is trained by receiving multiple training images wherein each training image of the multiple training images is labeled as segmentable or not segmentable.

21. A tangible non-transitory computer readable storage medium that stores a computer program, the computer program, when executed by a processor, causing a medical system to perform a process to segment a medical image, the process comprising:
performing multiple, parallel segmentation processes employing different segmentation process initializations on an input image to generate a plurality of segmentation results, wherein the different segmentation process initializations are generated by random perturbations of a baseline segmentation process initialization;
marking each segmentation result of the multiple, parallel segmentation processes as a potential success (PS) or potential failure (PF); and
combining the segmentation results marked as PS to produce an output segmentation result for the input image.

22. The tangible non-transitory computer readable storage medium according to claim 21, wherein the process further comprises:
marking each segmentation result of the multiple, parallel segmentation processes as a potential success (PS) or potential failure (PF); and
identifying a largest group of mutually similar segmentation results, wherein: segmentation results belonging to the largest group of mutually similar segmentation results are marked as PS; and segmentation results not belonging to the largest group of mutually similar segmentation results are marked as PF.

* * * * *